United States Patent [19]

Breneman et al.

[11] Patent Number: 4,690,810

[45] Date of Patent: Sep. 1, 1987

[54] DISPOSAL PROCESS FOR CONTAMINATED CHLOROSILANES

[75] Inventors: William C. Breneman, Vancouver, Wash.; David M. Reeser, Tigard, Oreg.

[73] Assignee: Union Carbide Corporation, Danbury, Conn.

[21] Appl. No.: 844,362

[22] Filed: Mar. 26, 1986

[51] Int. Cl.$^4$ .................. C01B 33/12; C01B 7/00; C01F 55/26; C01F 11/20
[52] U.S. Cl. .................................. 423/335; 423/240; 423/339; 423/497
[58] Field of Search ............... 423/335, 497, 240 S, 423/240 R, 336, 339

[56] References Cited

PUBLICATIONS

Kwatera et al., Possibilities of Controlling Wastes Formed in the Reduction of Silicon Chlorides by hydrogen, 1978, 90:141802h.

Mellor, A Comprehensive Treatise an Inorganic and Theoretical Chemistry, vol. VI, 1947, p. 967.

*Primary Examiner*—John Doll
*Assistant Examiner*—Lori S. Freeman
*Attorney, Agent, or Firm*—M. N. Reinisch

[57] ABSTRACT

Method for treatment of contaminated chlorosilanes with lime to obtain an environmentally inept silica base product.

3 Claims, 1 Drawing Figure

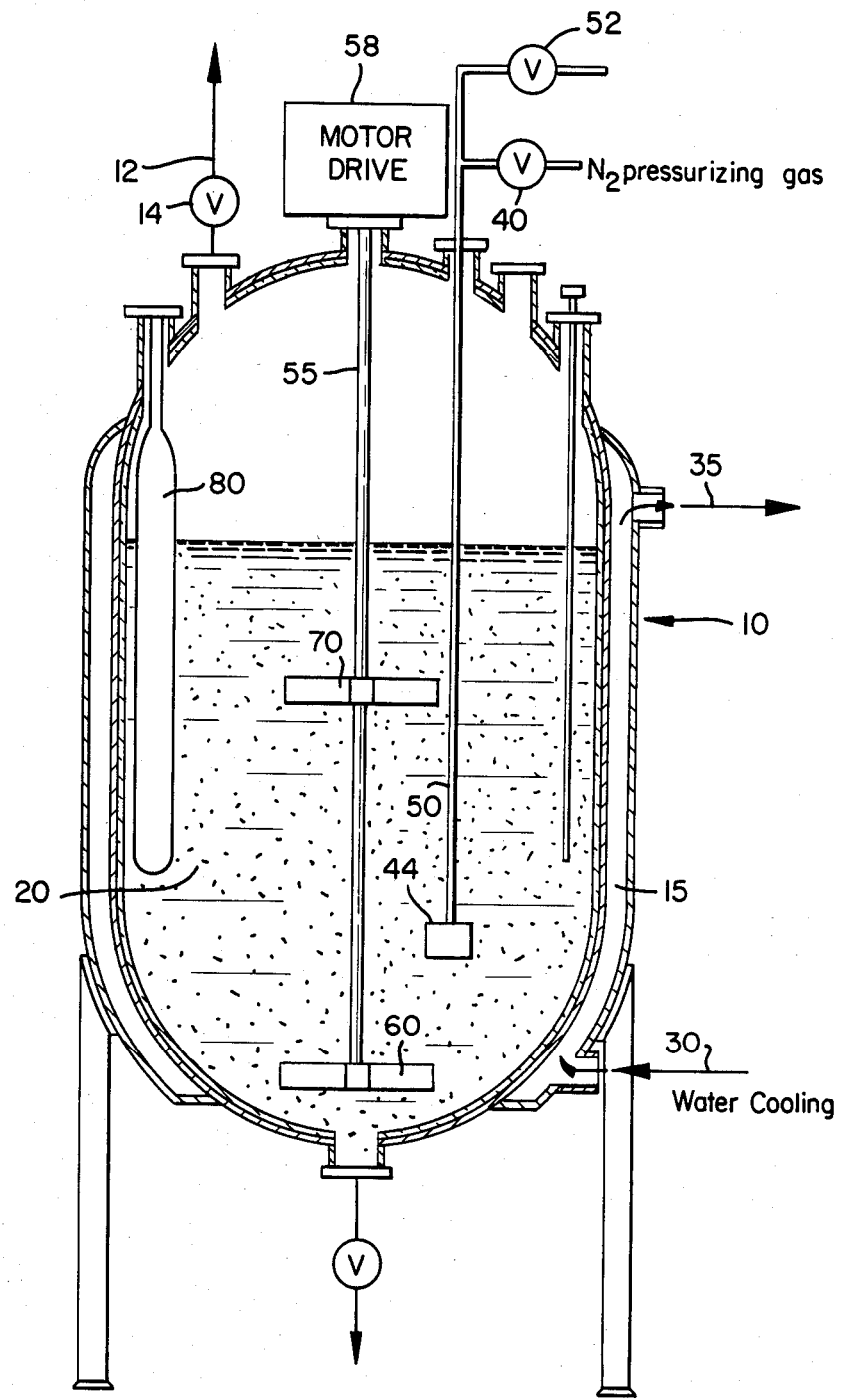

DISPOSAL PROCESS FOR CONTAMINATED CHLOROSILANES

INTRODUCTION

This invention is directed to a simple, safe, and controllable process for the conversion of contaminated chlorosilanes, e.g., metal chlorides and minor amounts of metals, into a stable material which is essentially environmentally inert. The contaminated chlorosilanes are generated in the course of purifying metallurgical grade silicon to a very high purity "electronic" grade silicon.

BACKGROUND OF THE INVENTION

The present invention is directed to a process for converting a liquid chlorosilane mixture of predominantly trichlorosilane and silicon tetrachloride, contaminated with various metal chlorides and minor amounts of metals, into environmentally acceptable products in an efficient manner. In the course of the purification of metallurgical silicon to electronic purity as described, for example, in U.S. Pat. No. 4,519,999 (incorporated herein by reference), essentially all impurities present initially in the silicon feed are rejected in the course of purification in mixture with chlorosilanes, e.g., trichlorosilane and silicon tetrachloride. Such impurities amount to about 2% by weight of the metallurgical grade silicon starting material and, when metallurgical grade silicon is reacted with hydrogen chloride to form trichlorosilane, as noted in U.S. Pat. No. 4,519,999, the rejected impurities admixed with chlorosilanes consist primarily, by weight percent of the mixture, of from 0.1 to 5% in the aggregate of chlorides of aluminum, iron, titanium, and up to 20% in the aggregate of elemental iron, silicon and aluminum. The aforementioned impurities are conventionally removed from the process system by dilution in a liquid mixture stream of predominantly trichlorosilane and silicon tetrachloride. Particulate impurities in the mixture are inherently smaller in size than 40 microns, e.g., 10–40 microns. To dispose of the contaminated mixture, it has been a common practice, prior to this invention, to add the mixture to water, hydrolyzing the mixture constituents to oxides, and co-producing a dilute hydrochloric acid, which is then neutralized with a suitable base. To accomplish this reaction in a manner such as that the reaction vessel will not become plugged with the silica solids formed by hydrolysis, extremely high levels of agitation have been required along with very large amounts of water. Burning techniques have also been proposed for waste disposal as described in U.S. Pat. No. 4,519,999 noted above. Such burning techniques are effective in some circumstances, but ordinarily require expensive equipment and fuel.

BRIEF DESCRIPTION OF THE DRAWINGS

The drawing shows a glass-lined steel vessel containing an aqueous slurry for carrying out the method of the invention

SUMMARY OF THE INVENTION

The present invention reduces or eliminates many of the major problems encountered in prior practices. In a particular embodiment, a reaction vessel of acid-resistant construction, e.g., glass-lined steel, is fitted with an agitator consisting of a lower high pumping rate circulation blade and an upper high shear blade for immediate dispersion of the subnatant feed, a cooling jacket, and a reactant feed pipe entering at the lower part of the vessel. An aqueous lime slurry bath (CaO to H$_2$O ratio by weight of 0.05 to 0.02), suitably fifteen (15) percent by weight CaO, is charged to a vessel of the type noted above, e.g., at approximately room temperature (20° C.), and contaminated chlorosilane mixture is added subnatantly in the lower ⅓ of the lime slurry bath at a rate which avoids fuming that can occur due to heat of reaction. The reaction involved is the oxidation of the silicon component of contaminated chlorosilane stream (silicon is the major metal component) and displacement of the calcium in the slurry solids by silicon, with the formation of an aqueous phase containing dissolved CaCl$_2$. The overall reaction chemistry is represented by the following in the case of trichlorosilane contaminated with a trivalent metal chloride (i.e., aluminum, iron):

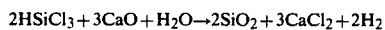

$$2HSiCl_3 + 3CaO + H_2O \rightarrow 2SiO_2 + 3CaCl_2 + 2H_2$$

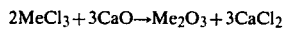

$$2MeCl_3 + 3CaO \rightarrow Me_2O_3 + 3CaCl_2$$

Metal contaminants in the form of particles of silicon, iron and aluminum are also at least partially oxidized. The solid reaction product slurry which results is in the form of agglomerates of fine particles of SiO$_2$ in which agglomerated oxide particles of iron, aluminum, titanium and unoxidized metal particles are entrapped. The agglomerated particles are essentially free of calcium and have a typical analysis of, by weight, 80 to 98% SiO$_2$, 0.1 to 10% Fe$_2$O$_3$, 0.01 to 10% Al$_2$O$_3$, 0.01 to 3% TiO$_2$ and trace amounts of other oxides. The resulting aqueous phase is a high purity solution of CaCl$_2$ (5 to 28%). During the reaction between the lime and contaminated chlorosilane stream, the temperature of the reaction mixture will increase in proportion to the waste chlorosilane feed rate. The temperature of the bath is thus controlled by limiting the chlorosilane rate, for example, by shutting off the waste feed from time to time. Applying external cooling to the slurry-containing vessel is also used to control the bath temperature. Significant fuming in the vessel is prevented by maintaining reaction temperature in the vessel at or below 150° F. at atmospheric pressure. When the pH of the reaction mixture drops from its initial pH of 12 or higher to the pH range of 7–8, the reaction capacity of the lime (CaO) slurry is spent, the lime being displaced by silica (SiO$_2$). The waste feed may be discontinued unless additional lime is added. At this time, the solids in the vessel are in the form of a stable suspension of fine silica particles in an aqueous phase consisting of a high purity medium-strength calcium chloride solution, and the solids can be removed by separation from the aqueous phase; metal oxide impurities (oxide of Al, Fe, Ti) and elemental silicon particles are entrapped in the silica slurry particles. The silica slurry has an indicated viscosity of about 300 cstk. The silica slurry is readily filtered, e.g., on a vacuum belt filter, to produce a filter cake of agglomerated silica particles with about 40% moisture and a clear filtrate of about 5 to 28% by weight calcium chloride solution.

In a preferred embodiment of the present invention, a contaminated liquid chlorosilane stream is fed subnatantly to a water-based lime slurry bath of nominally 15 percent lime (CaO) by weight (as CaO to H$_2$O, weight ratio of 0.05 to 0.20 is satisfactory), in a vessel equipped for vigorous agitation of the bath. The bath is maintained at a temperature of between 32° to 200° F., and at a positive pressure above the vapor pressure of the chlorosilane feed mixture, suitably 10 psi above, until the reaction mixture reaches a pH of 7-8 from its initial pH of about 13. The resulting hydrolyzed slurry, e.g., silica particles of about the same size as the original lime particles with entrapped smaller particles of metal and metal oxide impurities, is then easily filtered to yield a high silica solid which is environmentally inert. The resulting high purity clear calcium chloride filtrate solution can be upgraded to a commercially acceptable level of 35% by conventional techniques, e.g., evaporation.

In previous techniques, disposal of contaminated chlorosilanes was accomplished, for example, by burning in a high temperature incinerator, or by the procedure of U.S. Pat. No. 4,519,999. Burning techniques involve a significant cost for fuel and require relatively complicated high temperature processing equipment. Previous hydrolyzing techniques used liquid mixtures in neutral or acidic aqueous solutions which were then later neutralized. These neutralization methods generally required large, expensive vessels and did not provide control over the rate of heat rise associated with neutralization reactions. Furthermore, hydrochlorosilanes could be present among the various compounds in the waste stream and these compounds form shock-sensitive reaction products with acid water such that unpredictable explosions can occur during or following the hydrolysis reaction.

Because of the concern that the hydrochlorosilanes will react vigorously with alkaline agents such as lime or caustic to form explosive hydrogen gas along with slimy unfilterable gels, the use of high pH hydrolysis has not been previously practiced. A significant discovery of the present invention is that the use of a high pH hydrolysis lime slurry technique, rather than simply a soluble high pH reagent, provides the beneficial effect of forming an easily dewaterable silica base solid, which displaces CaO, and is stable against further chemical attack likely to be encountered in the normal environment. The silica base solid, in which metal oxide impurities are entrapped, will not solvate into landfill leachate and does not evolve hydrogen gas nor exposure to ambient conditions, is not toxic to animals by EPA standards, and is not toxic even at large dosages. In addition to producing a more easily handled solid silica hydrolyzate, the lime slurry hydrolysis technique of the present invention, when practiced in a closed, modest pressure reaction, does not result in any significant build-up of silica solids on the reactor internals such as agitators, thermowells, and internal walls of the reactor vessel. Hydrogen produced by the base catalyzed reaction of water with silanic hydrogen is evolved at a rate easily accommodated by controlling the feed rate of the chlorosilane mixture to the reactor. By operating the reactor at a modest positive pressure differential above the vapor pressure of the chlorosilane mixture in the feed mixture, a substantially complete reaction is achieved within the reactor, and vent losses of HCl and volatile chlorosilanes are minimized.

The present invention will be more fully understood with reference to the drawing wherein a glass-lined steel vessel 10 contains an aqueous slurry bath 20, initially comprised of finely divided particles, e.g., 200 mesh (U.S. Series) of commercial grade lime (ratio of CaO to $H_2$ in slurry of 0.05 to 0.20, by weight). Water cooling is provided at 30, 35 for cooling jacket 15 of vessel 10, and vessel 10 can be pressurized, suitably with nitrogen gas by way of 40. Contaminated chlorosilane feed stream is introduced via tube 50, control valve 52 and check valve 44 into bath 20 at the lowest ⅓ of the bath depth. Motor drive 58 rotates paddles 60, 70, which are mounted on shaft 55, to agitate bath 20 and, together with fixed baffle 80, maintain turbulent flow conditions throughout the bath 20. Upon introduction of the contaminated chlorosilane stream into the CaO slurry by way of lance 50, an exothermic reaction proceeds rapidly. (A typical contaminated stream composition is, by weight, 0.5 to 30% trichlorosilane, 70 to 95% silica tetrachloride, 0.1 to 5% in the aggregate of Fe, Al and Ti chlorides, up to 20% in the aggregate of Fe, Si, Al, Ti metal particles). In the course of the reaction, the silicon components of the chlorosilane stream are oxidized and, as $SiO_2$, displace CaO from the slurry 20, with the calcium from the initial slurry forming $CaCl_2$ by reaction with the chlorine component of the incoming stream, and dissolving to provide a high purity $CaCl_2$ solution. The hydrogen gas evolved in the course of reaction of chlorosilane, e.g., trichlorosilane, is released at 12 by way of pressure vent value 14. The contaminated chlorosilane stream is continually introduced into vessel 10 (the rate being controlled to avoid fuming of the slurry) until the pH of the liquid phase in vessel 10 decreases from about 13 to the range of 7-8. When this point is reached, essentially all of the calcium in the initial CaO slurry has combined with the chlorine component of the chlorosilane stream and is present in vessel 10 as an aqueous solution of $CaCl_2$. The solid material of the slurry at this time is fine particles of $SiO_2$ within which are entrapped oxides of Fe, Al, Ti and particles of silicon of substantially the same size as the starting lime particles. The solids are conventionally removed from vessel 10 and filtered to provide an essentially inert, amorphous, predominantly $SiO_2$ material.

The following example will further illustrate the present invention.

EXAMPLE

Using apparatus of the type shown in the drawing, 1500 gallons of a slurry of commercial grade CaO sized predominantly 60–100 microns in water (15% by weight CaO), was provided in a glass-lined steel vessel; the pH of the slurry was greater than 13. A contaminated chlorosilane stream of the analysis shown below in Table A was introduced into the vessel until the pH of the slurry reached about 7; the amount of contaminated chlorosilane introduced and treated was 3,670 lbs.

TABLE A

| | |
|---|---|
| trichlorosilane | 14.0 wt. % |
| silicon tetrachloride | 76.0 wt. % |
| aluminum chlorides | 0.04 wt. % |
| iron chlorides | 0.10 wt. % |
| titanium chlorides | 0.02 wt. % |
| silicon | 10.0 wt. % |
| iron | 0.06 wt. % |
| aluminum | 0.04 wt. % |

The solids recovered from the vessel had the following analysis:

| | Hydrolyzed Solids |
|---|---|
| silica | 89.7 wt. % |

-continued

| Hydrolyzed Solids | |
|---|---|
| silicon | 10.0 wt. % |
| iron oxide | 0.16 wt. % |
| aluminum oxide | 0.08 wt. % |
| other trace amounts | 0.02 wt. % |

The analysis of the aqueous phase was as follows:

| | |
|---|---|
| $CaCl_2$ | 25% by weight |
| aluminum | 30 parts per million |
| iron | 30 parts per million |
| other trace amounts | <10 parts per million total |

What is claimed is:

1. A method for the conversion of a stream of contaminated chlorosilanes to a stable, substantially inert and filterable solids mass, said stream of chlorosilanes being predominantly trichlorosilane and silicon tetrachloride and being contaminated by about 0.1 to about 5 percent by weight of impurities selected from the chlorides of aluminum, iron, titanium, and up to 20% by weight of finely divided metals having a particle size of less than 40 microns selected from silicon, iron and aluminum, said method comprising
   (i) providing a bath of water-based lime particle slurry having a CaO to $H_2O$ ratio, by weight, of about 0.05 to 0.20 and a pH of at least 9
   (ii) introducing into the lime particle slurry bath at a location substantially below its surface, a said stream of contaminated chlorosilanes to cause reaction of the chlorosilanes and contaminants with CaO to result in (a) replacement of the solid particles of CaO in the bath with solid reaction product particles of $SiO_2$ in which oxides of other contaminants are entrapped and (b) an aqueous phase containing dissolved $CaCl_2$
   (iii) monitoring the pH of the aqueous phase and recovering said solid reaction products particles from the bath when the pH is in the range of 7–8.

2. A method in accordance with claim 1 wherein the lime particle slurry bath is provided in a vessel which is adapted to be pressurized and externally cooled to minimize fuming from the bath.

3. A method in accordance with claim 2, wherein said bath is maintained at a temperature in the range of 32° to 200° F. and at a positive pressure.

* * * * *